United States Patent
Heller et al.

(10) Patent No.: US 7,181,158 B2
(45) Date of Patent: Feb. 20, 2007

(54) METHOD AND APPARATUS FOR ENHANCING THE INTEGRITY OF MENTAL COMPETENCY TESTS

(75) Inventors: Donald Ray Heller, Pine Island, MN (US); Thomas Alan Shore, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 607 days.

(21) Appl. No.: 10/600,062

(22) Filed: Jun. 20, 2003

(65) Prior Publication Data

US 2004/0259062 A1  Dec. 23, 2004

(51) Int. Cl.
*G09B 11/00* (2006.01)
(52) U.S. Cl. .................... 434/362; 434/353
(58) Field of Classification Search ........... 434/323, 434/350, 353, 362, 365
See application file for complete search history.

(56) References Cited

U.S. PATENT DOCUMENTS

| | | | |
|---|---|---|---|
| 5,841,655 A | | 11/1998 | Stocking et al. |
| 5,947,747 A | * | 9/1999 | Walker et al. .............. 434/354 |
| 6,018,617 A | * | 1/2000 | Sweitzer et al. ............ 434/323 |
| 6,112,049 A | * | 8/2000 | Sonnenfeld ................. 434/350 |

* cited by examiner

*Primary Examiner*—Kathleen Mosser
(74) *Attorney, Agent, or Firm*—Roy W. Truelson (57) ABSTRACT

Multiple variants of essentially the same multiple-choice questions are generated, having similar appearance, but actually different answers. Any single test has at most one variant of any particular question for which multiple variants exist. Different versions of the test can be generated by changing the combination of question variants used. In one aspect, different versions of the test identified by different combinations of variant questions can be used to determine the source of an unauthorized leak of test questions. In another aspect, the responses of a test subject to variant questions can be analyzed for suspicious patterns, indicating possible unauthorized access to a previous test version.

15 Claims, 6 Drawing Sheets

METHOD AND APPARATUS FOR ENHANCING THE INTEGRITY OF MENTAL COMPETENCY TESTS

FIELD OF THE INVENTION

The present invention relates to mental competency testing, and in particular to testing methods and apparatus which help to identify or discourage fraud in the administration of mental competency tests.

BACKGROUND OF THE INVENTION

Standardized tests of mental competency are widely used in a variety of applications. In addition to the well-known college entrance examinations, such tests are used to measure student progress through elementary and secondary school years, to verify competence for entry into the practice of a profession, such as medicine, law, accounting, real estate, etc., to verify minimum competence to posses a license or permit, such as a driver's license, and for many other uses. As used herein, "mental competency test" refers broadly to any of various types of tests which ask questions of a test subject and require communicative responses, whether such tests measure knowledge of facts, memory, analytical ability, aptitude, mental speed, linguistic capabilities, or other intellectual attributes, either alone or in combination. Such tests are often given in a multiple-choice format, because multiple-choice provides advantages of ease of scoring and comparison of results.

In most (although not necessarily all) such applications, it is expected that the test subject will not know the specific questions and answers in advance of taking the test. Having advance knowledge of either the questions or the answers would give the test subject a significant advantage with respect to other test subjects, and would undermine the integrity of the testing process itself. Therefore, testing authorities go to considerable lengths to keep test materials secret from potential test subjects. Unfortunately, security breaches do sometimes occur, and test subjects sometimes gain unauthorized access to test materials in advance of taking a test.

One common testing security technique is to assure that all test subjects take the test at the same time. I.e., a particular version of the test is prepared for use on a particular date and time, and simultaneously distributed to all test subjects at the appointed time. Prior to distribution, the test questions and answers are closely guarded secrets, enmeshed in considerable physical security. In general, this technique can provide a high level of security, but the requirement that all subjects take the test at the same time may be impractical in certain circumstances.

In many environments, it is a practical necessity to offer the test on a continuing basis or frequently scheduled basis. In these environments, it is not generally practical to change the test version each time a test is offered. A test subject who takes the test in these environments may walk away from the test with knowledge that would be useful to another subject taking the test a few hours, a few days, or a few weeks later.

One common application for mental competency tests is the use of certification examinations by various private companies acting as testing authorities, which are intended to assure that the test subject is competent to perform some set of tasks. In particular, a variety of certification examinations are used in the computer industry to assure competency to maintain or administer computer systems, perform repairs, design custom installations, write custom application programming code, and so forth. Such certification tests are designed and maintained by the companies themselves, and due to the economic realities of hiring and training, are generally offered on a continuing basis and in a variety of dispersed geographic locations. Often, obtaining a job or promotion, or keeping an existing position, is dependent on successful completion of a certification examination. These examinations are therefore of considerable importance to the individual being tested.

An exposure exists where knowledge gained by one or more test subjects taking a test may be later imparted to other test subjects taking the same test, or a subsequent version of the same test. While this exposure exists for any form of mental competency test, it is particularly acute in the case of certification tests, which are offered on a continuing basis.

A legitimate test subject normally remembers some aspects of the test, such as the general subject areas, types of questions, level of difficulty, and so forth. Such a test subject will usually remember a handful of questions in incomplete detail, i.e., he may remember the gist of the question and what he thought to be the correct answer. It is difficult or impossible to prevent this knowledge from being taken away and potentially shared with other test subjects. But such knowledge is not likely to significantly skew the results of a well-designed test. The details which will be remembered are too few, and these will not always be remembered accurately.

But in some circumstances, unscrupulous individuals have obtained complete or nearly complete copies of a test in advance. This might be accomplished, e.g., with collusion of a test proctor, or by a test subject photographing the test using a miniature camera, and later providing the test to others. Other systematic methods of obtaining test questions and answers might also be used.

If a test subject is provided with a complete or nearly complete copy of test questions and correct answers in advance, that subject can simply memorize the correct answers, without having to master the material. The subject's score on the test will not reflect the true state of the subject's competence intended to be tested.

One known method for reducing this exposure is to use pools of questions, the pool being substantially larger than the number of questions on any one test, so that when giving a test, a subset of questions is selected from the pool. The use of computerized testing makes it possible to change the subset of questions each time a test is given. However, creating a sufficiently large question pool increases the cost of maintaining the test. The cost is particularly high in the computer industry, where new versions of systems, devices and applications are constantly being introduced.

A need exists for improved techniques for discouraging and/or detecting improper access to text questions and answers.

SUMMARY OF THE INVENTION

Multiple variants of essentially the same multiple-choice questions are generated, having similar appearance, but actually different answers. Any single test has at most only one variant of any particular question for which multiple variants exist. Different versions of the test can be generated by changing the combination of question variants used.

In one aspect of the preferred embodiment, different versions of the test identified by different combinations of variant questions are distributed to different testing administrators, different geographic areas, and/or at different time periods. The differences in variant questions form a sort of version identifying code, which can be used to determine the source of an unauthorized leak of test questions.

In another aspect of the preferred embodiment, at least some of the multiple variants can be viewed as qualified "trick" questions. All variants of a single question are intended to be of approximately equal difficulty for a test subject who has no unauthorized knowledge of the test questions and answers. However, if a test subject is relying on questions and answers to a previous test, he may has a greater chance of misreading the question because it is similar to a variant of the same question with which he is familiar. This probability can be used to advantage by analyzing test responses.

In another aspect of the preferred embodiment of the invention, patterns of responses to different questions are compared to identify unusually high occurrences of wrong answers to questions for which multiple variants exist. These patterns suggest not only that the test subject may be using answers to a previous examination, but may be used to identify the source of the previous examination which was used by the test subject.

While the use of multiple variants of particular questions in accordance with the preferred embodiment of the present invention will not necessarily prevent or detect all test abuses, it can decrease the usefulness of unauthorized test copies from the point of view of the test subject, and at the same time help to identify likely sources of test misappropriation and misuse.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
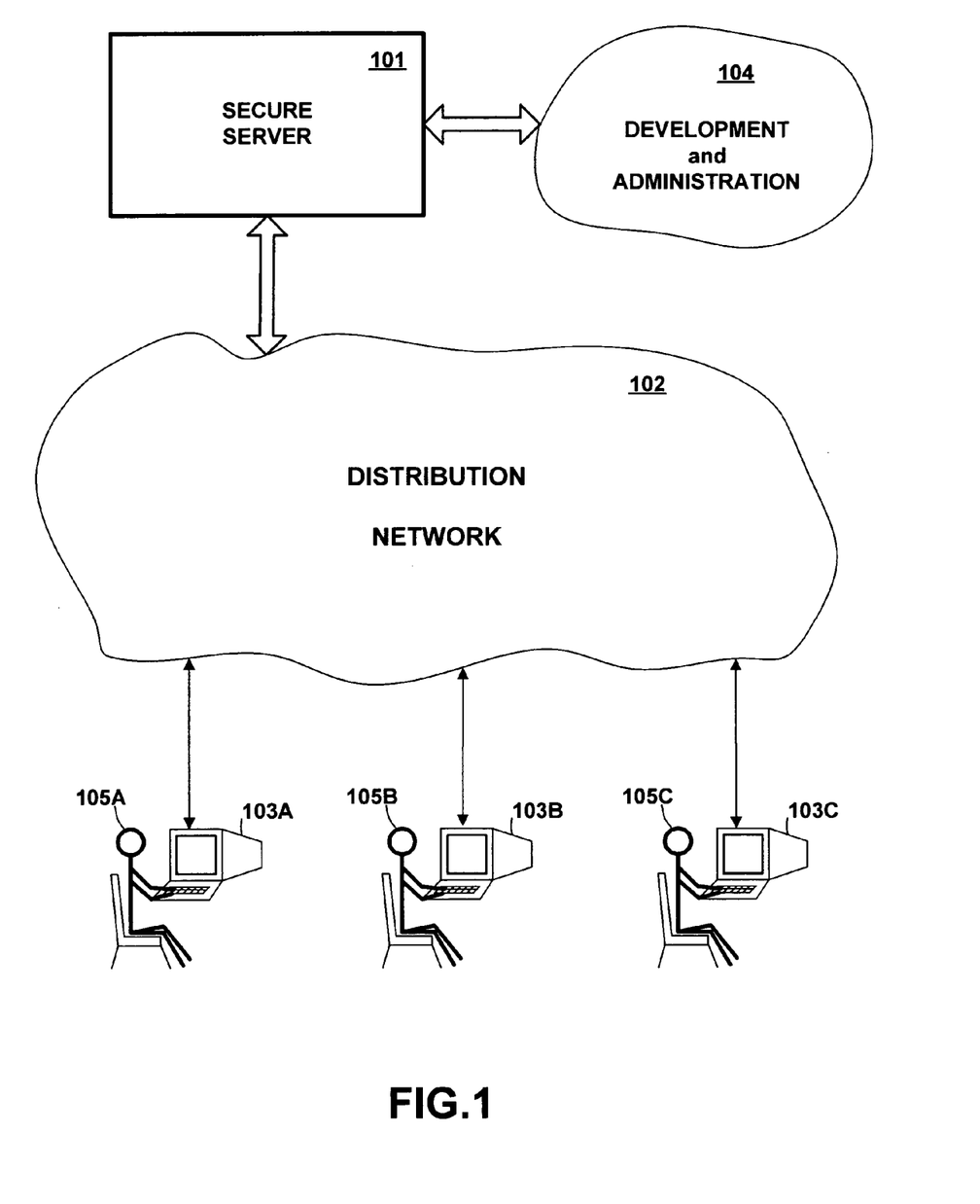
FIG. 1 is a high-level conceptual representation of a testing environment for administering mental competency tests, in accordance with the preferred embodiment of the present invention.

Referring to the Drawing, wherein like numbers denote like parts throughout the several views, FIG. 1 is a high-level conceptual representation of a testing environment for administering mental competency tests, in accordance with the preferred embodiment of the present invention. The main repository of test-related information is a secure server computer system 101. Copies of the test are distributed through distribution network 102 to multiple test workstations 103A–C (herein referred to generally as reference number 103), where respective test subjects 105A–C (herein referred to generally as reference number 105) take the test by interactively reading and answering test questions on the workstations 103. Test responses or results are propagated back through the distribution network to secure server 101.

Secure server system 101 contains test questions, answer keys, and statistical result data, as explained in greater detail herein. Server system 101 is, in general, owned or controlled by the testing authority, i.e., the entity which ultimately controls the legitimate use of the test. Although server system 101 is represented and described herein as a single computer system, it will be understood that it could in fact be a collection of computer systems, and that the various test-related functions described herein could be distributed on different computer systems or portions thereof comprising secure server 101.

Distribution network 102 may be any means or combination or means, now known or hereafter developed, for transmitting or distributing data. In addition to purely electronic means such as distribution over an electronic network such as a telephone network or the Internet, distribution network 102 may include transmission of data recorded on media by post, courier, or similar delivery mechanisms. Network 102 is represented for clarity in FIG. 1 as a single conceptual entity, it being understood that network 102 may be simple or very complex. In the simple case, network 102 may be nothing more than a set of connections to server system 101, which directly administers all the tests. Alternatively, network 102 may contain multiple hierarchical levels, involving many complex channels and mechanisms. Network 102 may be entirely under the control of the testing authority, but more commonly at least parts of network 102 are under control of third parties, and it is possible that the entire distribution network is under the control of third parties.

Development and administration 104 represents that entity or entities responsible for development of the test, maintenance of the test, monitoring test administration, and so forth. In the exemplary embodiment, it is assumed that development and administration 104 is some internal portion of the testing authority, although this is not necessarily always the case. For example, the initial development of test questions could be contracted out. Development and administration 104 could represent a single individual responsible for these functions, but will more typically be a group of individuals.

Secure system 101 and development and administration 104 are necessarily protected by a relatively high degree of security. The techniques described herein are of little value if an unauthorized individual, such as test subject, is able to breach the security of system 101 and access test data on that system directly. Since these systems are in general under direct control of the testing authority, and there is little reason for wide access, maintaining the requisite security in server system 101 and in development and administration 104 should not be unduly difficult. On the other hand, while it is desirable to enforce security in distribution network 102, it must be recognized that the testing authority may have far less control over the operation of distribution network 102. It is assumed that security breaches may occur in distribution network 102, and techniques which help to identify those breaches, as described herein, may be of some value.

In the preferred embodiment illustrated in FIG. 1, the test is administered on an interactive computer workstation. The test could alternatively be given on paper, orally, or by other means, in which case the distribution network 102 may be altered appropriately to the form of test administration. However, at some level test results would be entered as data in a digital data processing system, such as secure server 101, for analysis as described in greater detail herein.

Figure 2:
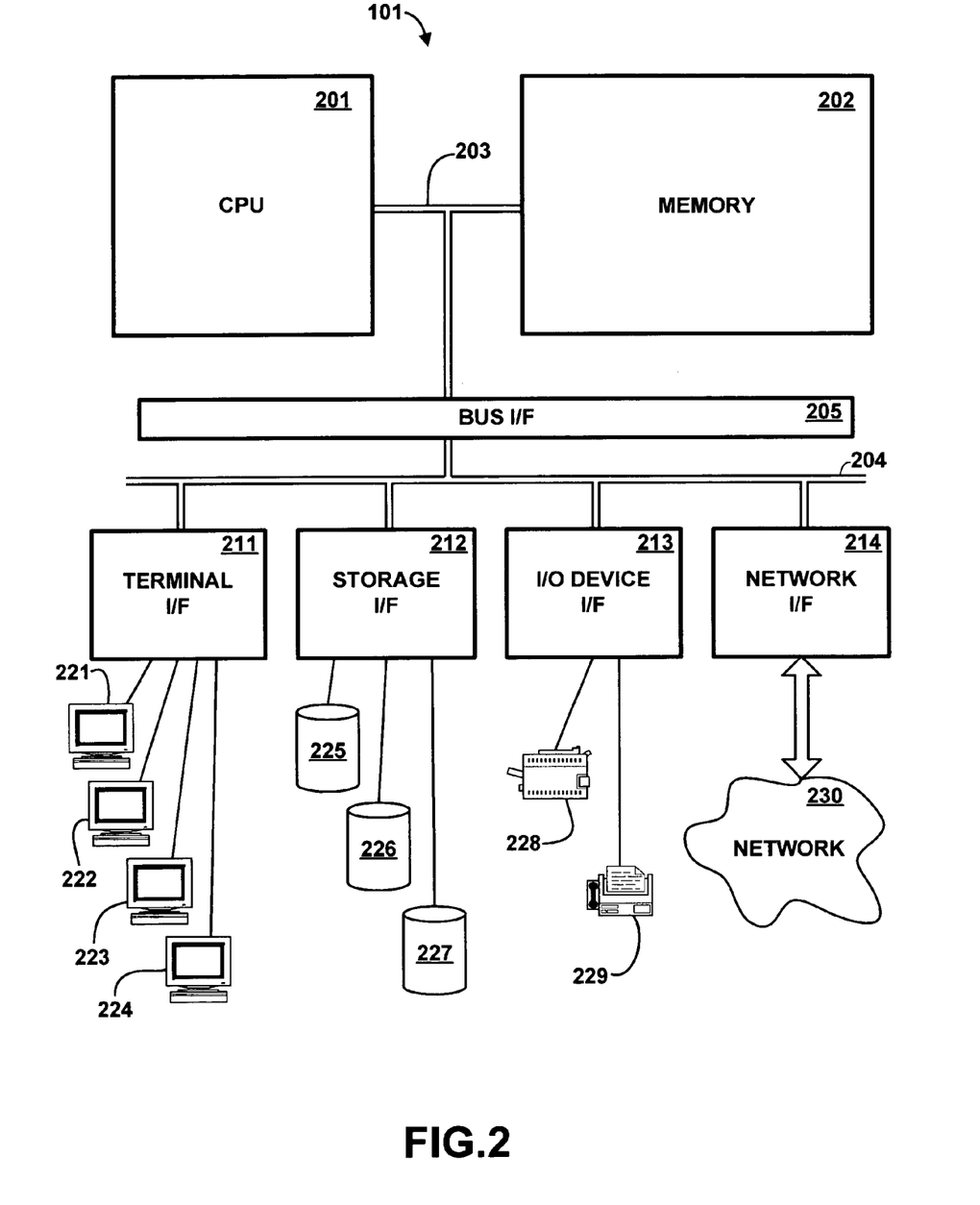
FIG. 2 is a high-level block diagram of the major hardware components of a server computer system functioning as the main repository of test-related information, according to the preferred embodiment of the present invention.

FIG. 2 is a high-level representation showing in greater detail the major hardware components of a representative secure server computer system 101, according to the preferred embodiment of the present invention. CPU 201 is a general-purpose programmable processor which executes instructions and processes data from main memory 202. Main memory 202 is preferably a random access memory using any of various memory technologies, in which data is loaded from storage or otherwise for processing by CPU 201.

Memory bus 203 provides a data communication path for transferring data among CPU 201, main memory 202 and I/O bus interface unit 205. I/O bus interface 205 is further coupled to system I/O bus 204 for transferring data to and from various I/O units. I/O bus interface 205 communicates with multiple I/O interface units 211–214, which may also be known as I/O processors (IOPs) or I/O adapters (IOAs), through system I/O bus 204. System I/O bus may be, e.g., an industry standard PCI bus, or any other appropriate bus technology. The I/O interface units support communication with a variety of storage and I/O devices. For example, terminal interface unit 211 supports the attachment of one or more user terminals 221–224. Storage interface unit 212 supports the attachment of one or more direct access storage devices (DASD) 225–227 (which are typically rotating magnetic disk drive storage devices, although they could alternatively be other devices, including arrays of disk drives configured to appear as a single large storage device to a host). I/O device interface unit 213 supports the attachment of any of various other types of I/O devices, such as printer 228 and fax machine 229, it being understood that other or additional types of I/O devices could be used. Network interface 214 supports a connection to an external network 230 for communication with one or more other digital devices. Network 230 may be any of various local or wide area networks known in the art. For example, network 230 may be an Ethernet local area network, or it may be the Internet. Additionally, network interface 214 might support connection to multiple networks.

It should be understood that FIG. 2 is intended to depict the representative major components of system 101 at a high level, that individual components may have greater complexity than represented in FIG. 2, that components other than or in addition to those shown in FIG. 2 may be present, that the number, type and configuration of such components may vary, and that a large computer system will typically have more components than represented in FIG. 2. Several particular examples of such additional complexity or additional variations are disclosed herein, it being understood that these are by way of example only and are not necessarily the only such variations.

Although only a single CPU 201 is shown for illustrative purposes in FIG. 2, computer system 101 may contain multiple CPUs, as is known in the art. Although main memory 202 is shown in FIG. 2 as a single monolithic entity, memory 202 may in fact be distributed and/or hierarchical, as is known in the art. E.g., memory may exist in multiple levels of caches, and these caches may be further divided by function, so that one cache holds instructions while another holds non-instruction data which is used by the processor or processors. Memory may further be distributed and associated with different CPUs or sets of CPUs, as is known in any of various so-called non-uniform memory access (NUMA) computer architectures. Although memory bus 203 is shown in FIG. 2 as a relatively simple, single bus structure providing a direct communication path among CPU 201, main memory 102 and I/O bus interface 205, in fact memory bus 203 may comprise multiple different buses or communication paths, which may be arranged in any of various forms, such as point-to-point links in hierarchical, star or web configurations, multiple hierarchical buses, parallel and redundant paths, etc. Furthermore, while I/O bus interface 205 and I/O bus 204 are shown as single respective units, system 101 may in fact contain multiple I/O bus interface units 205 and/or multiple I/O buses 204. While multiple I/O interface units are shown which separate a system I/O bus 204 from various communications paths running to the various I/O devices, it would alternatively be possible to connect some or all of the I/O devices directly to one or more system I/O buses.

Computer system 101 depicted in FIG. 2 has multiple attached terminals 221–224, such as might be typical of a multi-user "mainframe" computer system. Typically, in such a case the actual number of attached devices is greater than those shown in FIG. 2, although the present invention is not limited to systems of any particular size. Preferably, at least some of these attached terminals are used by personnel in development and administration 104 for performing various tasks related to the development and administration of the test. It is further possible that some of these terminals will be terminals 103 used by test subjects, although in the typical environment it is expected that there will greater separation between terminals used by test subjects and the secure server. User workstations or terminals which access computer system 101 might also be attached to and communicate with system 101 over network 230. Computer system 101 may alternatively be a single-user system, typically containing only a single user display and keyboard input.

While various system components have been described and shown at a high level, it should be understood that a typical computer system contains many other components not shown, which are not essential to an understanding of the present invention. In the preferred embodiment, computer system 101 is a computer system based on the IBM AS/400™ or i/Series™ architecture, it being understood that the present invention could be implemented on other computer systems.

Figure 3:
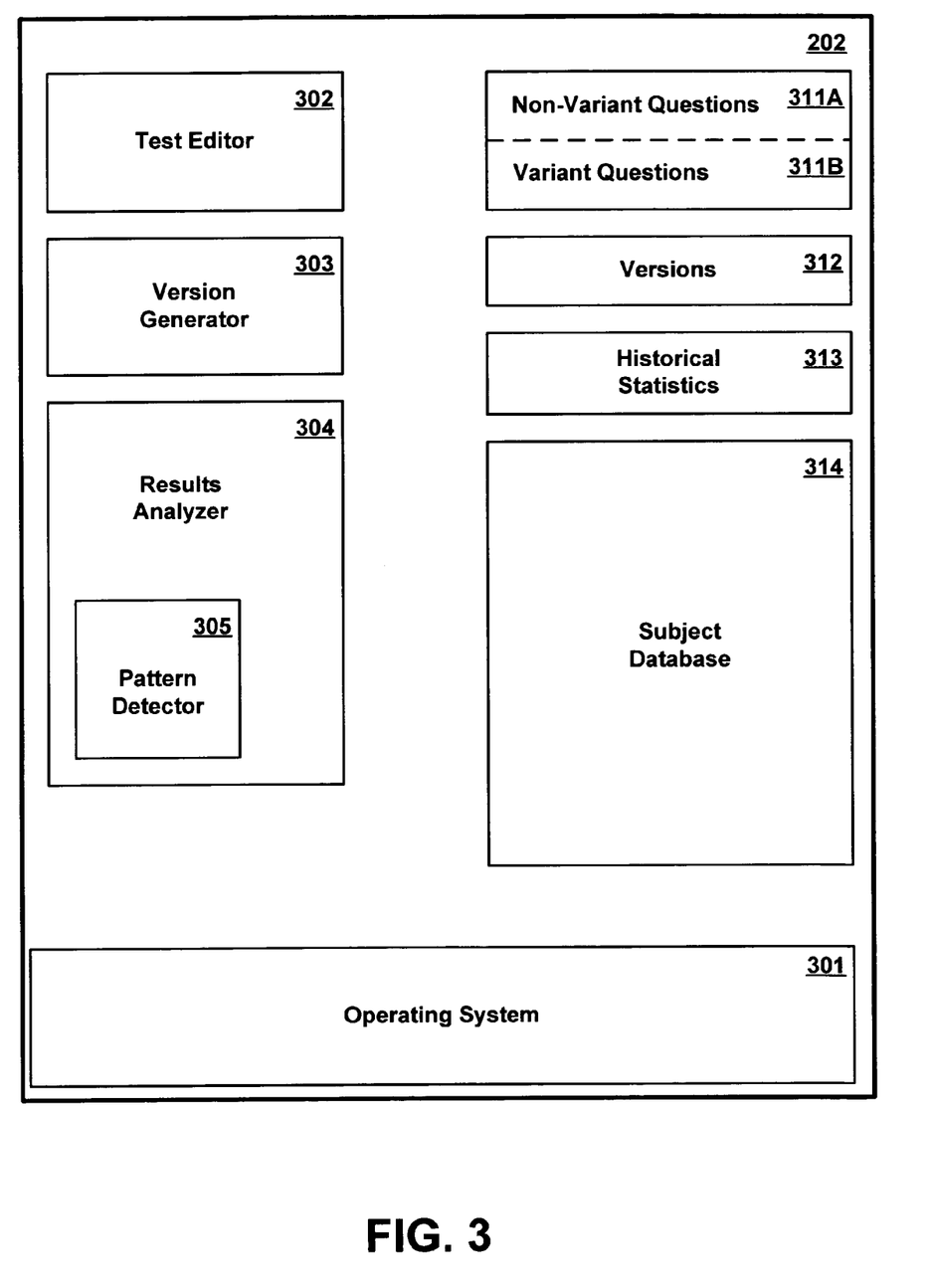
FIG. 3 is a conceptual illustration of the major software components of a server computer system for test-related information, according to the preferred embodiment.

FIG. 3 is a conceptual illustration of the major software components of system 101 in memory 202. Operating system kernel 301 provides various low-level software functions, such as device interfaces, management of memory pages, management and dispatching of multiple tasks, and so forth, as is well-known in the art. A pool of test questions and answers for creating test versions is maintained in a questions database (herein designated generally as feature 311), comprising a set of non-variant questions 311A and a set of variant questions 311B, as explained further herein. The number of questions in questions database 311 may be substantially greater than the number of questions of any particular version of the test, allowing questions to be rotated, but it need not be. Test editor 301 represents one or more tools used for the maintenance of tests, in particular the generation and editing of test questions in database 311 by personnel in development and administration 104. For example, in general it is expected that test editor 301 would contain a text editor for composing and editing the text of questions. However, it may also contain more sophisticated tools, such as dictionary/thesaurus for assisting the developer in composing questions, search capability for searching the existing question database for similar questions, and so forth.

Versions database 312 contains a record of the content of each test version, i.e., the questions and variants of questions offered on each respective version of the test. Additionally, versions database 312 contains information useful in determining how and when a version was used, such as the dates the version was offered, the geographic locations at which it was offered, the distribution channels (e.g. particular testing subcontractors, the world wide web, etc.), the number of subjects taking the version, and so forth. Versions database 312 could contain, with respect to each test version, the full text of each test question offered in that particular version, but in the preferred embodiment it contains a reference to each question in questions database 311, without repeating the full text. Version generator 303 is tool used to generate a particular test version from questions database 311. In general, a version is generated by selecting questions from database 311 and creating a record of the questions and variants selected in versions database 312, as explained more fully herein.

It will be understood that the testing authority may offer multiple tests (which may or may not be related), and multiple versions of each test. I.e., the testing authority may create different tests for different purposes, the different tests covering different (and possibly overlapping) subject areas. For example, one test may be used to certify competence in computer programming language A, while a second is used to certify competence in programming language B, while a third is used to certify competence in system administration and the use of system administration tools. There may be some subject areas (and some test questions) which are common to the first and second test, or to all three. As used herein, a "version" refers to some variation of a test which has essentially the same purpose and covers essentially the same subject matter as other versions of the same test. E.g., there may be multiple versions of the test used to certify competence in programming language A. The testing authority may use a common questions database 311 for multiple different tests, or a separate database 311 for each separate test. Similarly, it may use a common versions database 312 or statistics database 313, or separate databases.

Subjects database 314 contains information concerning each test subject and the results of his tests. I.e., in addition to standard identifying information, subject database contains, with respect to each test subject, the complete results of each test given by the testing authority which the subject has taken. In the preferred embodiment, "complete results" includes the test and version taken, and the answer submitted by the subject to each particular question. Preferably, there is only one subject database common to all tests maintained by the testing authority. The data for subjects database 314 is propagated from the test location through distribution network 102 to server system 101, using any of various known means. It is assumed that some secure system is used to control access to subject database 314, so that only authorized users are allowed to update the database with additional subject data.

Historical statistics database 313 contains statistical data concerning tests and test questions. Specifically, it contains statistical data showing, with respect to each test question and variant of a test question, the number of subjects answering correctly and incorrectly. Additional statistical data could be compiled, such as the passing rates or rate of correct responses at particular geographies or during particular times or using particular distribution channels, etc.

Results analyzer/grader 304 is an executable computer program which analyzes result data from subject database 314 to determine the score of a subject taking a test (i.e., a numerical score, and/or whether the subject passed the test). Results analyzer/grader 304 also generates historical statistics for statistics database 313 from test results entered into results database. Specifically, in the preferred embodiment analyzer 304 includes a suspicious pattern detection function 305 for detecting suspicious patterns in the results of test data submitted by a subject or group of subjects which may indicate improper use of the test, as explained in greater detail herein.

Although test editor 302, version generator 303, and results analyzer 304 are shown as separate program entities in FIG. 3, it will be understood that some or all of the functions performed by these programs could be combined in a single program, or could be embedded or divided into other programs. Furthermore, while four separate databases 311–314 are represented in FIG. 3, the number of databases for maintaining test related data could vary, and some of the data described herein might be combined in a single database or maintained in multiple separate databases. Additionally, although functional programs 302–304 and databases 311–314 are depicted in FIG. 3 on a single computer system 101 for completeness of the representation, it is not necessarily true that all functions will be present on a single computer system or will be performed on a single computer system. For example, composition and editing of test questions may be performed by test editors located in a distributed manner in individual workstations, while analysis of test results might be performed by a centralized server.

Although a certain number of modules, programs or files are shown in the conceptual representation of FIG. 3, it will be understood that the actual number of such entities may vary, and in particular, that in a complex test development and maintenance environment, the number of such entities is typically much larger. Furthermore, it will be understood that various entities could be stored in a distributed fashion on multiple computer systems.

While the software components of FIG. 3 are shown conceptually as residing in memory 202, it will be understood that in general the memory of a computer system will be too small to hold all programs and other data simultaneously, and that information is typically stored in data storage devices 225–227, comprising one or more mass storage devices such as rotating magnetic disk drives, and that the information is paged into memory by the operating system as required. Furthermore, it will be understood that the conceptual representation of FIG. 3 is not meant to imply any particular memory organizational model, and that system 101 might employ a single address space virtual memory, or might employ multiple virtual address spaces which overlap.

Figure 4:
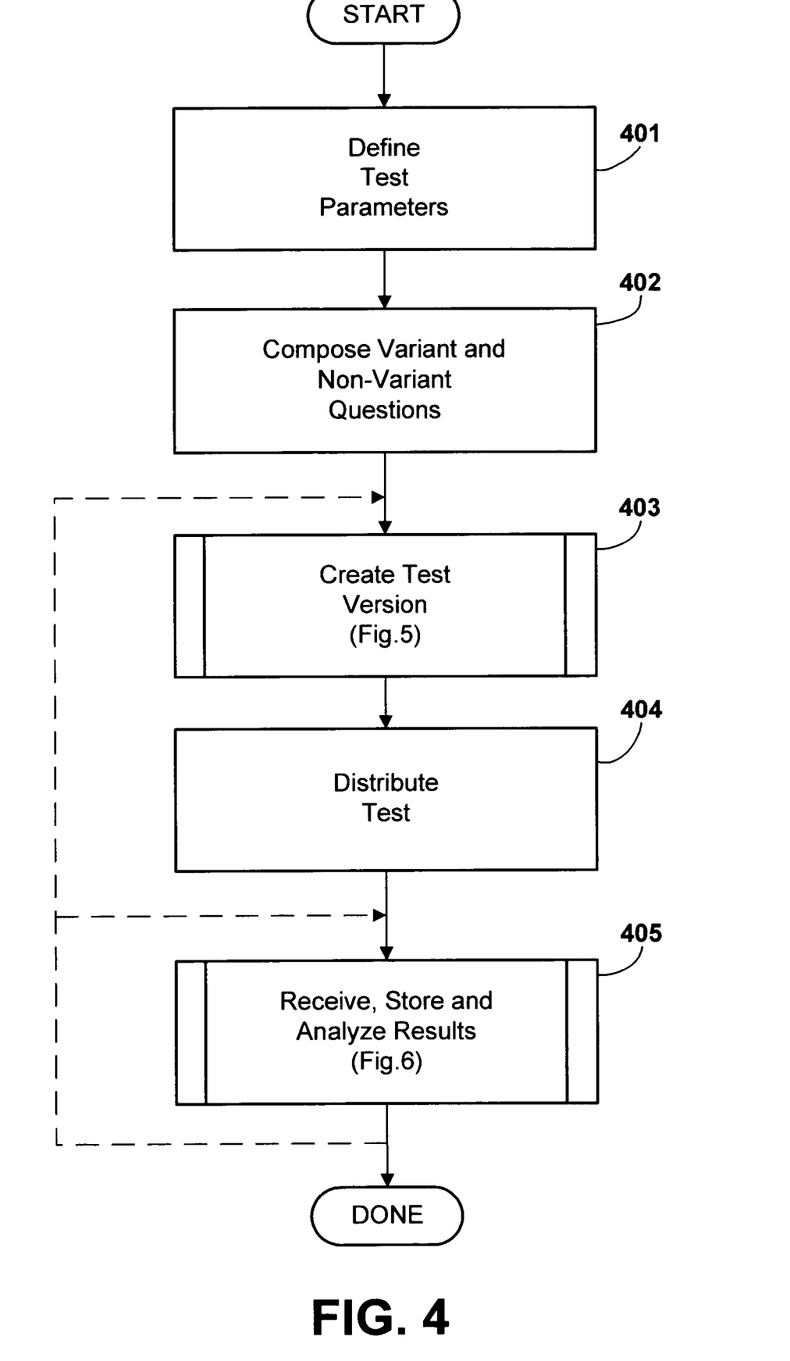
FIG. 4 is a high-level flow diagram of the overall process of generating and administering a test by a testing authority, including multiple versions of a test, according to the preferred embodiment.

FIG. 4 is a high-level flow diagram of the overall process of generating and administering a test by a testing authority, including multiple versions of a test, according to the preferred embodiment.

The test developers define the parameters of the test (step 401). The test definition may be an involved process involving many individuals having different spheres of expertise. For example, the test definition will determine such matters as the subject areas to be tested (usually assigning a number of test questions to each subject area), the general format of test questions, the total number of questions, the expected passing score, and so forth. Of particular interest to the subject of test security, the test developers will determine the number of variant and non-variant questions to be used on the test, as explained more fully herein.

The test developers compose a set of questions to satisfy the requirements of the test parameters (step 402). At least some of the questions are "variant questions", which are used, among other things, to detect and/or discourage possible test misuse. As used herein, a variant question is a question (including its multiple-choice answers) for which multiple variations of the same basic question have been generated, each variation using most of the same language, relating to approximately the same subject matter and of approximately equal difficulty (so that different variations are easily confused), but containing some significant difference. Any single version of the test contains at most one of the variations of a variant question. The underlying theory of variant questions is that a legitimate test subject will score about the same on all variant questions, regardless of which variation he is offered. But a subject who has been provided with questions and correct answers to a compromised test version will score significantly higher on the variant questions having the same variants as the compromised test version than on the variant questions having different variants from the compromised test version.

The following is a description of three specific methods or forms for generating variant questions, it being understood that there may be other possible ways to generate variants of a question. In the description below, it is assumed that each variant question has only two variants; however, it would be possible to create more than two variants of a single variant question.

In a first form of variant question (herein designated the "A" form), the question portion of both variants is identical, as are all but two of the multiple-choice answers. The language of two of the multiple choice answers is changed in some subtle way, so that the "correct" answer in the first variant is actually the "incorrect" answer in the second variant, and vice-versa. The following is a very simple example of a form "A" question having two variants:

First Variant: A hammer should be used to:
 1. Drive nails (correct)
 2. Remove bolts
 3. Tighten wires
 4. Remove paint Second variant: A hammer should be used to:
 1. Drive bolts
 2. Remove nails (correct)
 3. Tighten wires
 4. Remove paint If a test subject received an unauthorized copy of a test containing the first variant of the question above, and simply memorized questions and correct answers, he is more likely to answer incorrectly when presented with the second variant. In fact, because the second variant is confusingly similar to the first variant, he is more likely to answer this question incorrectly than he would a question he had never seen before.

In a second form of variant question (herein designated the "B" form) the question portion of both variants is identical, as are all but the correct multiple-choice. The language of the correct answer is changed so that the two correct answers in the two different variants do not resemble each other. The following is a very simple example of a form "B" question having two variants:

First Variant: A screwdriver should be used to:
 1. Remove lids from paint cans (correct)
 2. Remove nails
 3. Tighten wires
 4. Remove paint Second variant: A screwdriver should be used to:
 1. Tighten screws (correct)
 2. Remove nails
 3. Tighten wires
 4. Remove paint The use of form "B" is based on the assumption that a test subject who receives and memorizes an unauthorized copy of the test is likely to memorize only the correct answer to each question, not all the incorrect answers. Therefore the absence of the memorized correct answer leaves him in the dark. Unlike the case of form "A", he will know that he doesn't know the answer, but will be unlikely to remember the incorrect answers and infer the correct answer from them. Therefore, he has about a 25% probability (assuming four multiple-choice answers) of getting it right, which is much less than he would have had if the variation he had memorized were presented.

In a third form of variant question (herein designated the "C" form) the multiple-choice answers are identical, and the questions are confusingly similar, but some subtle difference exists in the questions to change the correct answer. This form of variant is particularly useful for quantitative or mathematical questions, where, e.g., a reversal of a number or operator can change the correct answer. The following is a very simple example of a form "C" question having two variants:

First Variant: If a 24-foot section of perforated pipe has 6 holes every 4 feet, how many holes does it have in all?
 1. 36 holes (correct)
 2. 16 holes
 3. 24 holes
 4. 30 holes Second variant: If a 24-foot section of perforated pipe has 4 holes every 6 feet, how many holes does it have in all?
 1. 36 holes
 2. 16 holes (correct)
 3. 24 holes
 4. 30 holes The use of form "C" is similar to that of form "A". A subject having memorized an unauthorized copy of the test and answers is likely to confuse the two variations, and thus get this question wrong if he has memorized a variation other than the one that is presented on his test.

It would be possible to employ exclusively variant questions on the test. Theoretically, a greater number of variant questions provides greater opportunity for detection of fraud. However, there are practical reasons for limiting the number of variant questions. If may be difficult to compose a variant question to cover some matter to be tested, and so requiring all questions to be variant questions may impose a burden on the developers who compose the questions. Furthermore, a large number of variant questions will tend to alert the test subject to the fact that the questions appear "tricky". Therefore, in the preferred embodiment, only some of the test questions are variant questions.

Preferably, form "A" (or form "C") is used, because these forms suggest a specific wrong answer to a person who has had access to the complementary variant of the same question. As a result, fraud is somewhat easier to detect by looking at the pattern of the answers, as explained below. However, form "B" is also potentially useful, and it may be desirable to employ a mixture of questions of form "A" and "B". In particular, since a test subject having unauthorized access to a previous test will generally recognize that a form "B" variant question is not the same as the one he had previously seen, it may help to demoralize the subject, sow dissension in the ranks of those practicing fraud, or otherwise discourage the misuse of tests.

Referring again to FIG. 4, after the test parameters are defined and the questions composed, at least one version of the test is generated. Preferably, test versions are generated automatically by version generator 303, although it would alternatively be possible to manually select the content of different test versions. The process of generating versions is represented in FIG. 4 as step 403, and is shown in greater detail in FIG. 5.

Figure 5:
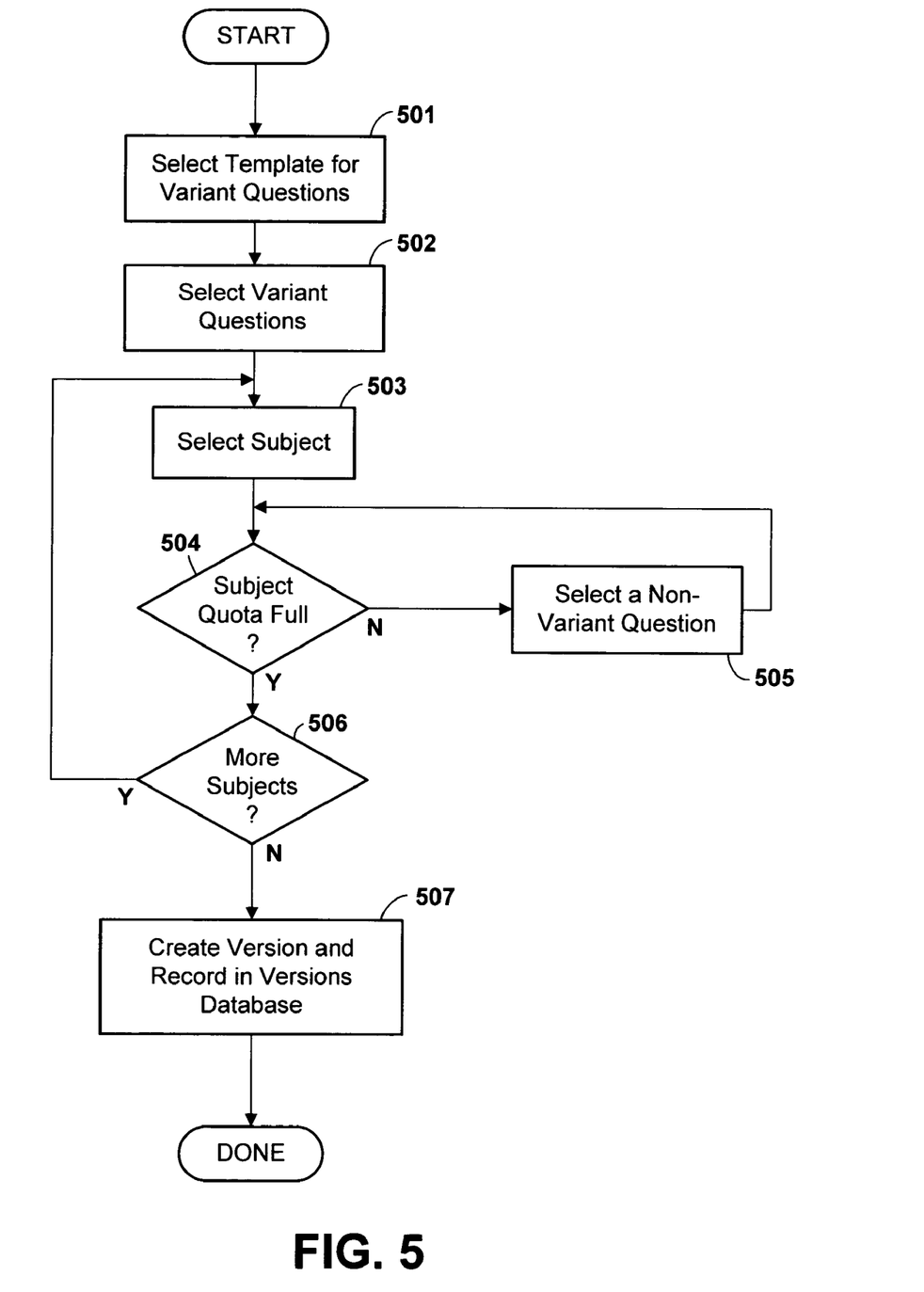
FIG. 5 is a flow diagram of the process of generating a version of a test using variant questions, according to the preferred embodiment.

Referring to FIG. 5, version generator 303 first selects or creates a template for the variant questions to be included in the version. The template defines the pattern of variants of variant questions to be used for the version to be created. For example, if there are 20 variant questions to be included in the test version, designated 1 through 20, and each variant question has two variants, designated "V" and "v", then a template might specify: 1V, 2V, 3V, 4V, 5v, 6v, 7v, 8v, 9V, 10V, 11V, 12V, 13v, 14v, 15v, 16v, 17v, 18v, 19v, 20v. Preferably, this template will uniquely identify the test version, and will not be used for any other version. A set of templates ready for use in generating versions may be defined at the time the test parameters are defined (i.e., in step 401), or may be created on demand by version generator 303.

In order to distinguish one version from another, it is desirable to use as many different variants of variant questions as possible. However, there is a design trade-off between the number of distinguishing variants and the number of versions supported. For example, if the test has 20 variant questions, each with two different variants, it is theoretically possible to create $2^{20}$ different test versions from all the combinations of the variant questions. Unfortunately, this would mean that some versions differ from one another by only a single variant question. In such a case, it may be difficult to draw meaningful inferences from the result data. If, on the other hand, only two different versions exist, each version would use the complement of the template used by the other, and these two versions would differ on all 20 of the variant questions. Such a difference should make it much easier to detect suspicious patterns of responses, provided that the test subject is being tested on a different version from the one to which he has obtained unauthorized access. Unfortunately, with only two versions, there is a high probability that the test subject will be using the same version he already has, and therefore suspicious patterns will not exist.

A compromise between maximum number of versions, and maximum difference between versions, is therefore preferred. For example, in the case of 20 variant questions, the 20 questions might be divided into five subsets of four each. Within each subset, any version always uses either the first or the second variant of each question. With five subsets, it is therefore possible to create $2^5$, or 32, different versions. Each version is guaranteed to differ from any other version by at least four variant questions, but on the average, the difference will be greater than this. Although a difference of four variant questions is not large, if a subject is simply memorizing answers to a copy of the test, it is still likely that the subject will perform significantly worse on the different variants, and that this pattern will show in the responses.

The average number of different variants that one may expect to encounter may be increased by intelligently allocating the templates. For example, if versions are changed on a temporal basis, the sequence of templates can be set so that the difference between any two successive versions is greater than four. Similarly, if different versions are used in different geographies, any time a version is changed in a particular geography, a template which maximizes the differences should be selected. This selections are made on the theory that a subject is most likely to be using an unauthorized test copy from the same geographic area, and one that is recent in time.

Having chosen a template for the variant questions, the variant of each respective variant question corresponding to the template is selected from the questions database 311 for inclusion in the test version being constructed (step 502).

On the assumption that the test contains some non-variant (conventional) questions, and there are more non-variant questions than used (i.e., a pool of non-variant questions, only some of which are used on any particular test version), the version generator performs steps 503–506 (If all the test questions are variant questions, or if there is no pool of extra non-variant questions, then steps 503–506 are skipped). When the test parameters are defined, the test typically is designed to cover multiple subject areas, and a quota of questions is assigned to each subject area. The version generator selects a subject area (step 503). If the question quota for the subject area is not yet full, the "N" branch is taken from step 504, and a non-variant question in the applicable subject area is selected at random from the pool of non-variant questions (step 505). The random selection continues until the quota for the selected subject area is full, causing the "Y" branch to be taken from step 504. If additional subject areas remain, the "Y" branch is taken from step 506 to select the next subject area at step 503. When all subject area quotas are filled, the "N" branch is taken from step 506. At this point, the version generator creates a version record in versions database 312 (step 507), the version record identifying each question and variant selected for use in the new test version.

Referring again to FIG. 4, the version thus created is then distributed to test subjects through distribution network 102, using any of various conventional means (step 404). The exact steps taken to distribute the test will vary depending on the structure of the distribution network and other factors. For example, copies of the test questions may be distributed electronically to subcontractors, who further transmit them to individual testing locations for administration of the tests to test subjects. There could be multiple levels in such a distribution chain. Alternatively, the testing authority may directly administer tests through special software (not shown) in server system 101, or through a different computer system or systems. Preferably, a record of the distribution of each version is made in version database 312; this could be performed either manually or using an automated tracking tool. I.e., some record is made in database 312, whereby it is possible to determine the set of circumstances in which a particular version is administered to test subject (such as a time period, geographical area, or particular distribution channel or subcontractor).

The server system then receives and analyzes test results as the subjects complete their tests and results are propagated back through the distribution network. This process is represented in FIG. 4 as step 405, and is shown in greater detail in FIG. 6.

Figure 6:
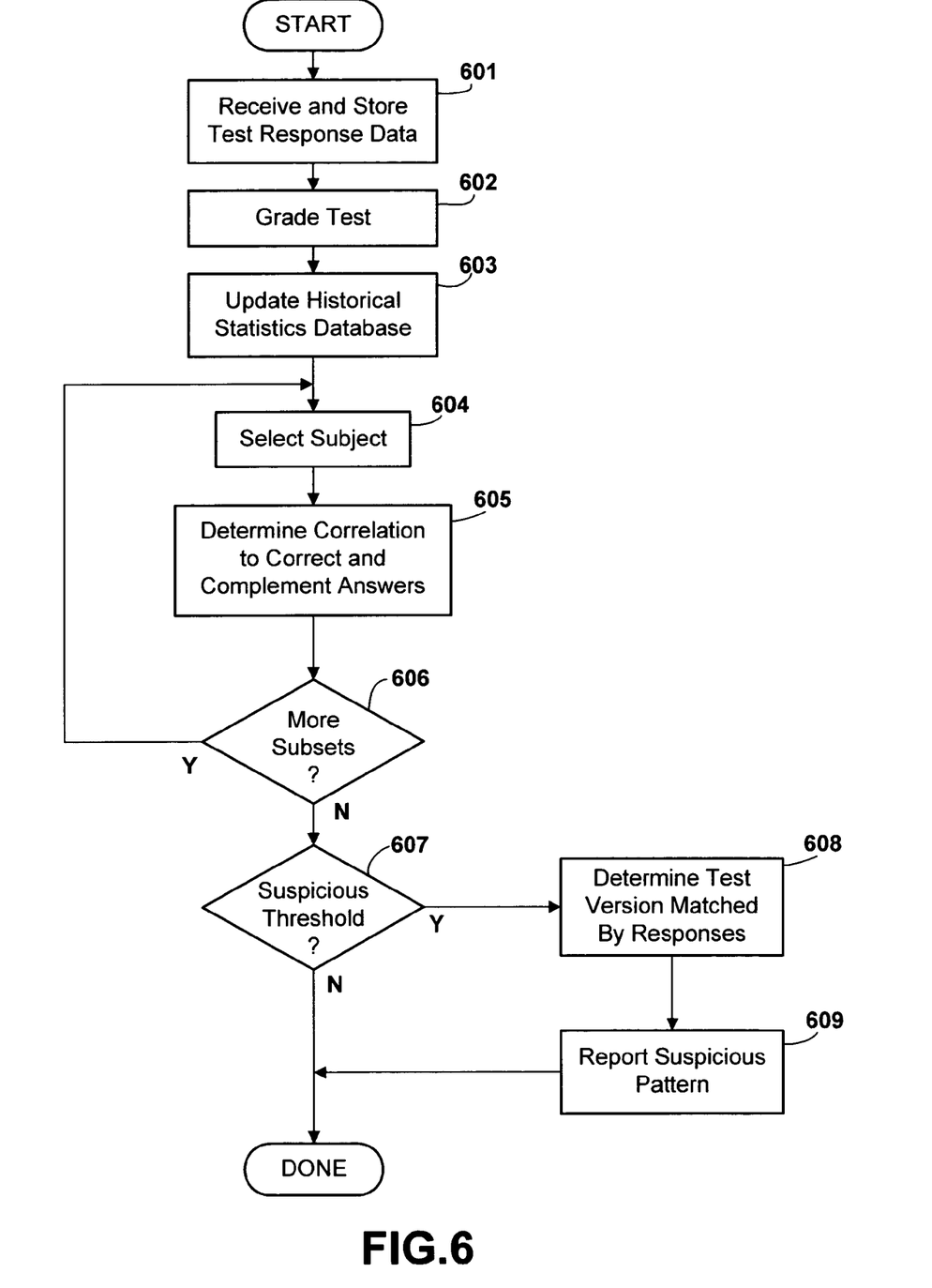
FIG. 6 is a flow diagram of the process of receiving and analyzing test results, according to the preferred embodiment.

Referring to FIG. 6, the complete test results (i.e., subject identifying data, test version used and answers to each individual question, as well as any other useful data) are received though the distribution network and stored in system 101 (step 601). Result analyzer/grader 304 scores or grades the results in a conventional manner by comparing the answers selected by the subject with the correct answer for each respective question, and determining a total score, whether the score is a "pass", or other criteria of success (step 602). Result analyzer/grader further updates historical pass/fail statistics, as well as historical statistical data for each individual question, in history database 313 (step 603).

A suspicious pattern detector 305 within result analyzer/grader 304 analyzes the pattern of test answers, and particularly the answers to variant questions, to detect suspicious patterns, indicative of possible misuse. Specifically, a pattern indicating that the subject is responding to variant questions of a different test version indicates possible misuse. Preferably, form "A" (or form "C") variant questions are used to support this type of pattern analysis.

Shown below are the correct answers for a typical example subset of 4-choice variant questions.

|  | 1st Variant Answer | 2nd Variant Answer |
|---|---|---|
| Question 1 | A | C |
| Question 2 | D | A |
| Question 3 | B | D |
| Question 4 | C | B |

If one assumes that, for a typical question, the average test subject answers the question correctly 70% of the time, and chooses any of the incorrect answers with equal probability, then the probability of choosing any particular incorrect answer is 10%. For a given subset of four variant questions, the average legitimate test subject will get all of them right about 25% of the time. I.e., a test subject taking a test version using the first variant subset will have an answer pattern of: A-D-B-C about 25% of the time. However, the odds that an average legitimate test subject, with no knowledge of a previous test, would choose not only a wrong answer to each of the four questions, but the particular pattern of wrong answers corresponding to the other complementary variants of the same questions (the second variant column above, being pattern C-A-D-B), is 10%×10%×10%×10%, i.e. 0.0001, or 1 in 10,000, an extremely unlikely event. Therefore, if a test subject answers with the correct answers for the complementary variants of even a single subset of four questions, this should be viewed with suspicion.

Of course, a fraudulent test subject might not answer all four questions of a subset with the correct answers according to the complementary variants of the questions. He may forget memorized answers, or deliberately make an occasional mistake to avoid looking "too good" on the test, or may in fact recognize that there is something different about a particular question. However, the probability of answering even three of the four questions in a subset according to the pattern of the complementary variants is approximately 0.0036, or 1 in 278, and even the probability of answering two of the four questions according to the pattern of the complementary variant is approximately 0.05, or 1 in 20. A single instance of a test subject answering two of the four questions according to the pattern of the complementary variant is statistically meaningless, but multiple instances of answering two (or three) questions of different subsets according to the pattern of the complementary variants is certainly suspicious.

The probabilities used above are based on representative numbers. In fact, in the preferred embodiment historical statistics database 313 contains complete statistics on the frequency of each answer to each test question, from which more exact probabilities with respect to any particular subset can be computed.

Referring again to FIG. 6, the suspicious pattern analyzer 305 selects a subset of the variant questions, the subset being the smallest group which all use the same variant, as explained above (step 604). It then separately computes the correlation of answers given by the test subject to the correct answers for the test version taken by the subject, and to the correct answers for the complementary variants of the questions taken by the subject (step 605). This correlation could be expressed as a simple integer (i.e. 0, 1, 2, 3 or 4 out of the four questions), or as a probability (i.e., the probability, based on historical statistics, that a subject's answers will match the pattern at least as often as the test subjects), or in some other form. If more subsets exist, the "Y" branch is taken from step 606 and the next subset is selected. When all subsets have been analyzed, the "N" branch is taken from step 606.

The pattern analyzer then determines whether the correlation to the complementary variants of the questions exceeds some pre-defined threshold (step 607). Again, this threshold may be simple integers, or may involve probability calculations or some other criteria. For example, a simple threshold test may be one subset matching at least three complementary variant answers, or two or more subsets matching at least two complementary variant answers. Alternatively, one could compute the probabilities of the different levels of pattern matches, and compare the overall probability to some pre-established threshold. If no apparent suspicious pattern exists, the "N" branch is taken from step 607.

Since it is not known which test version a test subject might have had unauthorized access to, and this could have been any version, it will be expected that for some subsets of variant questions, the test version to which a subject had unauthorized access used the same variants as the current test version. For any such subset, there should be no or low correlation between the test subject's answers and the pattern of answers to the complementary variants, although there should be a relatively high correlation to the correct answers.

If a suspicious pattern was detected at step 607, the pattern detector attempts to determine the test version to which the subject had unauthorized access by matching the pattern of responses with test versions (step 608). I.e., for any subset in which the correlation to the complementary variant is high, it is assumed that the test version to which the subject had access used the complementary variant. For any subset in which the correlation to the correct answers for the current test version is high, it is assumed that the test version to which the subject had access used the same variants as the current test version. By this simple analysis, a version signature can be reconstructed, which will uniquely identify the version to which the test subject probably had access. If the correlation in any particular subset is poor, it may be necessary to report multiple possible versions as potential matches.

The pattern detector then reports that a suspicious pattern was detected, including the probable test version that was used by the subject (step 609). The results reported by the pattern detector may optionally include probabilities associated with various patterns of responses and other information. The form of reporting may vary with the needs of the testing authority. Typically, some record of the detected suspicious pattern will be made in the test subject's personal record in subject database 314, although this is not necessarily the case. The reported data may also be placed in a separate database of suspicious events (not shown).

Where the "B" form of variant question is used, it is significantly more difficult to detect misuse, because one will expect that the answers to a subset of variant questions which is complementary to the subset previously seen by the subject will not exhibit any particular pattern. It may be possible to detect misuse from the fact that the subject will answer certain subsets of variant questions with high accuracy, and others with low or random accuracy, but in general a much larger number of questions is needed to achieve equivalent confidence in the conclusion that a pattern is suspicious.

Referring again to FIG. 4, analysis of test results at step 405 completes the general process of creating and using a test. For a particular test version, step 405 (represented in FIG. 6) will be performed repeatedly as different test subjects take the test version. This is represented in FIG. 4 as the dashed line which returns to a point between steps 404 and 405. Additionally, the testing authority may from time to time generate and distribute additional versions of the test, which is represented in FIG. 4 as the dashed line which returns to a point between steps 402 and 403.

The action to be taken by the testing authority upon receiving a report of a suspicious pattern is beyond the scope of the present invention. In general, it is recognized that statistical or probability analysis, no matter how compelling, may be insufficient in and of itself to support legal action against the test subject. However, in the fight against fraud, knowledge is a key tool. The present invention provides an automated, useful technique for detecting probable fraud, allowing the testing authority to further investigate, or to take remedial action (such as changing a test version which appears to have been compromised). Furthermore, a significant number of instances of suspicious patterns from multiple test subjects may itself indicate a pattern of fraud associated with one of the distribution channels, allowing corrective action to be taken.

The use of variant questions has additional benefits beyond the detection of suspicious patterns of test subjects, as described above. Occasionally, complete stolen tests are intercepted. The use of variant questions to create numerous test versions helps identify the source of a stolen test. The use of variant questions also tends to lower the scores of cheaters by suggesting the wrong answer, which offsets to some degree the unfair advantage of having access to answers beforehand. Finally, if there is a perception among would-be abusers that the test is changing rapidly, the incentive to steal and copy tests, as well as the incentive to buy copies of a stolen test, are reduced.

In the description above, it has been assumed that each test version is essentially static, i.e., it involves the same questions given to all test subjects taking that version. However, it would alternatively be possible to apply the techniques of the present invention to adaptive testing. Adaptive testing involves selecting questions for the subject based on the responses previously given, and such a test is normally administered by a computer. Adaptive testing could be used to further refine the detection of suspicious patterns in accordance with the preferred embodiment. Specifically, a number of variant questions might be held in reserve, for use only in the event that the test subject appears to be answering with a suspicious pattern. As an example, in addition to the variant question subsets described above, a subset of reserve variant questions is constructed, each reserve question having two variants A and B. But instead of assigning the A variant to some test versions and the B variant to others, all test versions would have the A variant of the reserve subset. If a test subject then appears to be answering questions from the other subsets in a suspicious manner, he will be presented with the B variants of the reserve set. This single reserve set is guaranteed to differ from all other test versions, and can be made sufficiently large so that suspicious patterns can be confirmed with a high degree of confidence. Such an approach requires some alteration of the order of steps performed as shown in FIGS. 4–6. Specifically, at least some suspicious pattern analysis must be performed in real time while the test subject is taking the test. The real time analysis could be a simplified version of more sophisticated analysis performed after the fact. E.g., it might be so simple as to involve administering the reserve questions any time an integer threshold of complementary variant answers is exceeded by the test subject.

In the description above, certain additional security precautions have been omitted for clarity of illustration and explanation. However, it is preferable to use other techniques in addition to those described herein for discouraging misuse of tests. Some such techniques are described below, it being understood that these are by way of example and not limitation.

Preferably, the test is administered to the test subject via computer. The computer automatically randomizes the order in which test questions are presented to the subject, and the order of the answers to each individual question. Thus, even for the same version of the test given to two successive test subjects, the same question will not appear at the same time, and the four multiple-choice answers will not necessarily have the same order.

Additional questions, which are not scored, can be inserted or removed from the test from time to time as a means of making the test appear as if it has changed, without the cost of redesign. The time given to the test subjects can be adjusted for the number of questions. Other changes might be made to the form or appearance of a test to give the impression that there has been a change, without any real change to the questions and answers.

In general, the routines executed to implement the illustrated embodiments of the invention, whether implemented as part of an operating system or a specific application, program, object, module or sequence of instructions may be referred to herein as "computer programs" or simply "program". The computer programs typically comprise instructions which, when read and executed by one or more processors in the devices or systems in a computer system consistent with the invention, cause those devices or systems to perform the steps necessary to execute steps or generate elements embodying the various aspects of the present invention. Moreover, while the invention has and hereinafter will be described in the context of fully functioning computer systems, the various embodiments of the invention are capable of being distributed as a program product in a variety of forms, and the invention applies equally regardless of the particular type of signal-bearing media used to actually carry out the distribution. Examples of signal-bearing media include, but are not limited to, recordable type media such as volatile and non-volatile memory devices, floppy disks, hard-disk drives, CD-ROM's, DVD's, magnetic tape, and transmission-type media such as digital and analog communications links, including wireless communications links. Examples of signal-bearing media are illustrated in FIG. 2 as memory 202, and as data storage devices 225–7.

Although a specific embodiment of the invention has been disclosed along with certain alternatives, it will be recognized by those skilled in the art that additional variations in form and detail may be made within the scope of the following claims:

What is claimed is:

1. A method for administering a mental competency test, comprising the steps of:
   generating a plurality of multiple-choice variant questions, each variant question having multiple variants;
   defining a plurality of versions of said mental competency test, each version containing a respective unique set of variants of said plurality of variant questions, each version containing no more than one variant of each respective variant question, wherein no two of said respective unique sets of variants are identical, wherein at least some of said variant questions comprise, for each respective variant question, a question portion which is identical in all variants of the respective variant question, and a plurality of answer portions corresponding to respective variants, the answer portions being different for each variant; and
   administering each of said plurality of versions of said mental competency test to a respective set of one or more test subjects.

2. The method of administering a mental competency test of claim 1, further comprising the steps of:
   receiving test responses from a plurality of test subjects; and
   analyzing said test responses to detect a pattern of probable unauthorized access to a version of said mental competency test different from the version to which the test responses pertain.

3. The method of administering a mental competency test of claim 1, wherein each of said plurality of answer portions for a respective variant question contains an incorrect answer which is confusingly similar to a correct answer contained in a different one of said plurality of answer portions.

4. The method of administering a mental competency test of claim 1, wherein each of said plurality of answer portions for a respective variant question contains a different correct answer and a set of incorrect answers, the set of incorrect answers being the same for all variants of the respective variant question.

5. The method of administering a mental competency test of claim 1, wherein said step of defining a plurality of versions comprises automatically selecting each respective unique set of variants of said plurality of variant questions, said automatically selecting step being performed by a digital computing device.

6. The method of administering a mental competency test of claim 1, further comprising the steps of:
   defining a plurality of discrete subsets of said plurality of variant questions, each said discrete subset containing an identical number of said variant questions, said identical number being greater than 1; and
   defining, for each respective subset of said plurality of discrete subsets of said plurality of variant questions, a corresponding plurality of discrete subsets of variants, each discrete subset of variants containing one variant of each respective variant question of the respective discrete subset of said plurality of variant questions;

wherein said step of defining a plurality of versions of said mental competency test comprises defining, for each respective version, a corresponding unique set of said discrete subsets of variants.

7. A method of administering a mental competency test, comprising the steps of:
   generating a plurality of multiple-choice variant questions, each variant question having multiple variants;
   defining a plurality of versions of said mental competency test, each version containing a respective unique set of variants of said plurality of variant questions, each version containing no more than one variant of each respective variant question, wherein no two of said respective unique sets of variants are identical, wherein at least some of said variant questions comprise, for each respective variant question, a plurality of question portions corresponding to respective variants, the question portions being different for each variant, and a common answer portion, wherein the correct answer is different for each variant; and
   administering each of said plurality of versions of said mental competency test to a respective set of one or more test subjects.

8. The method of administering a mental competency test of claim 1, wherein said step of administering each of said plurality of versions of said mental competency test to a respective set of one or more test subjects comprises administering said test to at least some of said test subjects using an interactive computer terminal.

9. A method of administering a mental competency test, comprising the steps of:
   generating a plurality of multiple-choice variant questions, each variant question having multiple variants;
   defining a plurality of versions of said mental competency test, each version containing a respective unique set of variants of said plurality of variant questions, each version containing no more than one variant of each respective variant question, wherein no two of said respective unique sets of variants are identical; and
   administering each of said plurality of versions of said mental competency test to a respective set of one or more test subjects, wherein said step of administering each of said plurality of versions of said mental competency test to a respective set of one or more test subjects comprises administering said test to at least some of said test subjects using an interactive computer terminal, wherein said step of administering said test comprises adaptively administering said test on an interactive computer terminal while monitoring responses of each test subject for a pattern of probable unauthorized access to a version of said mental competency test different from the version being administered to the test subject, and interrogating the subject with at least one reserve variant question if the monitoring step detects said pattern of probable unauthorized access.

10. A mental competency test administration apparatus embodied in one or more digital data processing systems, comprising:
   a data storage containing a plurality of versions of said mental competency test, each version containing a respective unique set of variants of a plurality of multiple-choice variant questions, each variant question having multiple variants, each version containing no more than one variant of each respective variant question, wherein no two of said respective unique sets of variants are identical, wherein at least some of said variant questions comprise, for each respective variant question, a question portion which is identical in all variants of the respective variant question, and a plurality of answer portions corresponding to respective variants, the answer portions being different for each variant; and a suspicious pattern analyzer which analyzes responses to said mental competency tests from a plurality of test subjects to detect patterns of probable unauthorized access to a version of said mental competency test different from the version to which the test subject responds.

11. The mental competency test administration apparatus of claim 10, wherein said data storage contains a first database of said multiple-choice variant questions, and a second database of versions, said second database identifying, for each respective version, the corresponding unique set of variants contained in the respective version.

12. The mental competency test administration apparatus of claim 10, wherein each of said plurality of answer portions for a respective variant question contains an incorrect answer which is confusingly similar to a correct answer contained in a different one of said plurality of answer portions.

13. The mental competency test administration apparatus of claim 10, wherein each of said plurality of answer portions for a respective variant question contains a different correct answer and a set of incorrect answers, the set of incorrect answers being the same for all variants of the respective variant question.

14. A mental competency test administration apparatus embodied in one or more digital data processing systems, comprising:

a data storage containing a plurality of versions of said mental competency test, each version containing a respective unique set of variants of a plurality of multiple-choice variant questions, each variant question having multiple variants, each version containing no more than one variant of each respective variant question, wherein no two of said respective unique sets of variants are identical, wherein at least some of said variant questions comprise, for each respective variant question, a plurality of question portions corresponding to respective variants, the question portions being different for each variant, and a common answer portion, wherein the correct answer is different for each variant; and a suspicious pattern analyzer which analyzes responses to said mental competency tests from a plurality of test subjects to detect patterns of probable unauthorized access to a version of said mental competency test different from the version to which the test subject responds.

15. A mental competency test administration apparatus embodied in one or more digital data processing systems, comprising:

a data storage containing a plurality of versions of said mental competency test, each version containing a respective unique set of variants of a plurality of multiple-choice variant questions, each variant question having multiple variants, each version containing no more than one variant of each respective variant question, wherein no two of said respective unique sets of variants are identical, wherein:

said data storage contains a plurality of discrete subsets of said plurality of variant questions, each said discrete subset containing an identical number of said variant questions, said identical number being greater than 1;

said data storage further contains, for each respective subset of said plurality of discrete subsets of said plurality of variant questions, a corresponding plurality of discrete subsets of variants, each discrete subset of variants containing one variant of each respective variant question of the respective discrete subset of said plurality of variant questions; and each version of said plurality of versions of said mental competency test comprises a corresponding unique set of said discrete subsets of variants; and a suspicious pattern analyzer which analyzes responses to said mental competency tests from a plurality of test subjects to detect patterns of probable unauthorized access to a version of said mental competency test different from the version to which the test subject responds.

* * * * *